(12) United States Patent
Bunce

(10) Patent No.: US 12,353,764 B1
(45) Date of Patent: Jul. 8, 2025

(54) SINGLE CYCLE REQUEST ARBITER

(71) Applicant: Marvell Asia Pte Ltd, Singapore (SG)

(72) Inventor: Robert Michael Bunce, Cary, NC (US)

(73) Assignee: Marvell Asia Pte Ltd, Singapore (SG)

( * ) Notice: Subject to any disclaimer, the term of this patent is extended or adjusted under 35 U.S.C. 154(b) by 87 days.

(21) Appl. No.: 18/328,542

(22) Filed: Jun. 2, 2023

Related U.S. Application Data

(60) Provisional application No. 63/424,436, filed on Nov. 10, 2022.

(51) Int. Cl.
*G06F 3/06* (2006.01)

(52) U.S. Cl.
CPC .......... *G06F 3/0659* (2013.01); *G06F 3/0613* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 5,920,699 A | 7/1999 | Bare | |
| 7,143,219 B1 | 11/2006 | Chaudhari et al. | |
| 7,739,436 B2 | 6/2010 | Meyer | |
| 8,467,213 B1 | 6/2013 | Channabasappa | |
| 9,569,369 B2 | 2/2017 | Sedlar et al. | |
| 10,141,034 B1 | 11/2018 | Zitlaw | |
| 10,824,505 B1 | 11/2020 | Swarbrick et al. | |
| 10,936,486 B1 | 3/2021 | Swarbrick | |
| 11,769,832 B2 | 9/2023 | Han et al. | |
| 11,923,995 B2 | 3/2024 | Raleigh et al. | |
| 2003/0028713 A1* | 2/2003 | Khanna | G11C 15/04 711/108 |
| 2009/0245257 A1 | 10/2009 | Comparan et al. | |
| 2009/0316700 A1 | 12/2009 | White et al. | |
| 2010/0013517 A1* | 1/2010 | Manohar | H03K 19/17744 326/38 |
| 2012/0215976 A1 | 8/2012 | Inoue | |
| 2013/0121178 A1 | 5/2013 | Mainaud et al. | |
| 2013/0329546 A1 | 12/2013 | Wijnands | |
| 2014/0215185 A1* | 7/2014 | Danielsen | G06F 9/3836 712/205 |
| 2014/0226634 A1 | 8/2014 | Voigt et al. | |

(Continued)

OTHER PUBLICATIONS

Wikipedia, "Network on a chip" retrieved from the Internet at https://en.wikipedia.org/wiki/Network_on_a_chip on Apr. 25, 2024.

(Continued)

*Primary Examiner* — Larry T Mackall
(74) *Attorney, Agent, or Firm* — Hamilton, Brook, Smith & Reynolds, P.C.

(57) ABSTRACT

A memory array includes a plurality of memory devices, each of which includes a memory configured to store packet data and a request arbiter configured to interface with other memory devices of the memory array. The request arbiter filters invalid requests from a plurality of requestors, and determines a bitvector representing a sequence of the plurality of requestors, the bitvector indicating whether each of the plurality of requestors has a valid request. The request arbiter outputs an indication of a first request to be serviced by the memory device, and shifts the bitvector to determine a second request to be serviced by the memory device.

21 Claims, 5 Drawing Sheets

(56) References Cited

U.S. PATENT DOCUMENTS

| | | |
|---|---|---|
| 2015/0006776 A1 | 1/2015 | Liu et al. |
| 2015/0188847 A1 | 7/2015 | Chopra et al. |
| 2015/0205530 A1* | 7/2015 | Eilert .................... G06F 3/0665 711/105 |
| 2017/0193136 A1 | 7/2017 | Prasad et al. |
| 2017/0195295 A1 | 7/2017 | Tatlicioglu et al. |
| 2018/0301201 A1 | 10/2018 | Kantipudi |
| 2020/0026684 A1 | 1/2020 | Swarbrick et al. |
| 2021/0385164 A1 | 12/2021 | Parmar et al. |
| 2022/0150044 A1 | 5/2022 | Xiang et al. |
| 2023/0315898 A1 | 10/2023 | Alaeddini |
| 2023/0316334 A1 | 10/2023 | Vankayala |
| 2024/0048508 A1 | 2/2024 | Viego et al. |

OTHER PUBLICATIONS

Fusella, et al., "Understanding Turn Models for Adaptive Routing: the Modular Approach," Design, Automation and Test in Europe (2018) 1489-1492.

Glass, et al., "The Turn Model for Adaptive Routing," Advanced Computer Systems Laboratory, 1992, 278-287.

Khan, et al., "Design of a Round Robin Arbiter On Resource Sharing," Proceedings of 8th IRF International Conference, May 4, 2014, Pune, India.

Lee, et al., "Probabilistic Distance-based Arbitration: Providing Equality of Service for Many-core CMPs," 2010 43rd Annual IEEE/ACM International Symposium on Microarchitecture, pp. 509-519.

Mandal, et al., "Theoretical Analysis and Evaluation of NoCs with Weighted Round-Robin Arbitration," Dept. of ECE, University of Wisconsin-Madison, Aug. 21, 2021.

Merchant, "The Design and Performance Analysis of an Arbiter for a Multi-Processor Shared-Memory System," Aug. 1984, Laboratory for Information and Decision Systems, Massachusetts Institute of Technology, Cambridge, Massachusetts 02139.

Next Hop Definition, Created Nov. 17, 2005, Retrieved from the Internet at http://www.linfo.org/next_hop.html on Sep. 15, 2022, The Linux Information Project.

Wikipedia, "Mesh Interconnect Architecture—Intel," Retrieved from the Internet on Nov. 23, 2022 at https://en.wikipedia.org/wiki/Turn_restriction_routing.

Wikipedia, "Turn restriction routing," Retrieved from the Internet on Nov. 23, 2022 at https://en.wikichip.org/wiki/Intel/mesh_interconnect_architecture.

* cited by examiner

SINGLE CYCLE REQUEST ARBITER

RELATED APPLICATION

This application claims the benefit of U.S. Provisional Application No. 63/424,436, filed on Nov. 10, 2022. The entire teachings of the above application are incorporated herein by reference.

BACKGROUND

Often in computing there is a need for arbitration among multiple requesters that require the use of a shared resource at the same time. For example, shared memory subsystems are implemented in a variety of networking and other computing applications. In such a configuration, several initiators may have access to a common memory. To serve a large number of initiators, the shared memory can have a substantial size (e.g., over 10 megabytes (MB)), and facilitates a high volume of data traffic to and from the memory.

SUMMARY

Example embodiments include a circuit comprising a memory array and a memory interface. The memory array may have a plurality of memory devices arranged in a plurality of rows and columns. Each of the memory devices may include a memory configured to store packet data and a request arbiter configured to interface with at least one other memory device of the memory array. The request arbiter may be configured to 1) filter invalid requests from a plurality of requestors, 2) determine a bitvector representing a sequence of the plurality of requestors, the bitvector indicating whether each of the plurality of requestors has a valid request, 3) output an indication of a first request to be serviced by the memory device, and 4) shift the bitvector to determine a second request to be serviced by the memory device. The memory interface may be configured to route requests from a requestor to the memory array.

The request arbiter may be further configured to filter the invalid requests, determine the bitvector, and output the indication during a common, single clock cycle. The request arbiter may filter the invalid requests and determine the bitvector independent of a clock signal. Each bit of the bitvector may represent a respective one of the plurality of requestors. Each bit of the bitvector may be one of 1) a first value indicating a valid request, and 2) a second value indicating the absence of a request or an invalid request.

Further embodiments include a circuit for arbitrating requests. A validate block may be configured to filter invalid requests from a plurality of requestors and output a bitvector representing a sequence of the plurality of requestors, the bitvector indicating whether each of the plurality of requestors has a valid request. A first rotation block may be configured to 1) output a first parallel signal representing the bitvector, and 2) shift the first parallel signal relative to the bitvector in response to a shift signal. A logic block may be configured to output a second parallel signal indicating a bit of the first parallel signal corresponding to a next request to be granted. A second rotation block may be configured to 1) shift the second parallel signal in a direction counter to the shift of the first rotation block, and 2) output a grant bitvector indicating one of the plurality of requestors to grant a next request.

Further, a shift block may be configured to output the shift signal selectively in response to detecting the grant bitvector. The validate block, first rotation block, and logic block may be configured to filter the invalid requests, output the parallel signal, and output the second parallel signal during a common, single clock cycle. The validate block may be further configured to filter the invalid requests and output the bitvector independent of a clock signal. Each bit of the bitvector may represent a respective one of the plurality of requestors. Each bit of the bitvector may be one of 1) a first value indicating a valid request, and 2) a second value indicating the absence of a request or an invalid request.

Further embodiments include a method of arbitrating requests. At a node array having a plurality of node devices arranged in a plurality of rows and columns, invalid requests may be filtered from a plurality of requestors, and a bitvector may be output representing a sequence of the plurality of requestors, the bitvector indicating whether each of the plurality of requestors has a valid request. A first parallel signal may be output representing the bitvector, and the first parallel signal may be shifted relative to the bitvector in response to a shift signal. A grant request may then be output indicating a bit of the first parallel signal corresponding to a next request to be granted. A second parallel signal may be shifted in a direction counter to the shift of the first rotation block, and a grant bitvector may be output indicating one of the plurality of requestors to grant a next request.

The shift signal may be output in response to detecting the grant bitvector. Filtering the invalid requests, outputting the parallel signal, and outputting the grant bitvector occur during a common, single clock cycle. Further, filtering the invalid requests and outputting the bitvector may occur independent of a clock signal. Each bit of the bitvector may represent a respective one of the plurality of requestors. Each bit of the bitvector may be one of 1) a first value indicating a valid request, and 2) a second value indicating the absence of a request or an invalid request.

Further embodiments include a circuit comprising a node array and an interface. The node array may have a plurality of node devices arranged in a plurality of rows and columns. Each of the node devices may include a processor configured to process packet data and a request arbiter configured to interface with at least one other node device of the node array. The request arbiter may be configured to 1) filter invalid requests from a plurality of requestors, 2) determine a bitvector representing a sequence of the plurality of requestors, the bitvector indicating whether each of the plurality of requestors has a valid request, 3) output an indication of a first request to be serviced by the node device, and 4) shift the bitvector to determine a second request to be serviced by the node device. The interface may be configured to route requests from a requestor to the node array.

The request arbiter may be further configured to filter the invalid requests, determine the bitvector, and output the indication during a common, single clock cycle. The request arbiter may filter the invalid requests and determine the bitvector independent of a clock signal. Each bit of the bitvector may represent a respective one of the plurality of requestors. Each bit of the bitvector may be one of 1) a first value indicating a valid request, and 2) a second value indicating the absence of a request or an invalid request.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
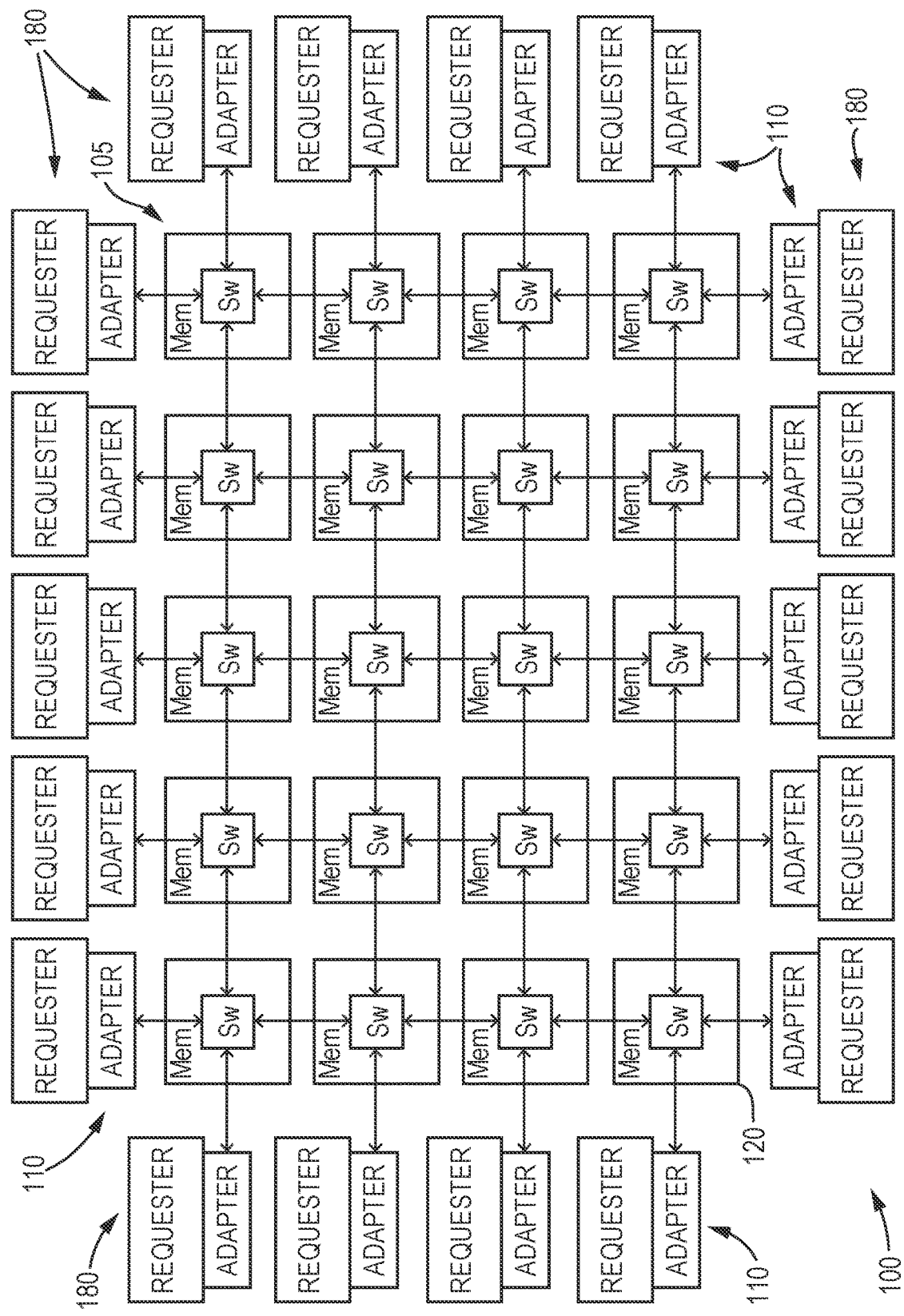
FIG. 1 is a block diagram of a shared memory subsystem in one embodiment.

FIG. 1 is a block diagram of a shared memory subsystem 100, which may be implemented in a variety of networking and other computing applications. In such a configuration, several requestors 180, such as processors, may have access to a common, shared memory array 105 via respective memory interfaces or adapters 110. As shown, the memory array 105 exhibits a "mesh" structure, which comprises several memory devices (e.g., device 120) arranged in a grid pattern and each connected with neighboring memory devices. A "mesh" may be understood as a structure that divides a space into a matrix of nodes, and the interconnects between the nodes move data from one node to another based on a routing algorithm. Thus, a given requestor 180 may access, store, and retrieve data at any one of the devices of the array 105, and each of the devices may route the data along a path through the array between the requestor 180 and a target device.

A transfer of data between two devices of the array 105 may be referred to as a "hop," and each hop may involve the transfer of data of any size between the devices. For example, a data transfer may be a parallel transmission of several bytes (e.g., 16, 32, or 64 bytes) of data between the devices. Such transfers occur both for requests from a requestor 180 and for a response from a target device, and each access operation can involve several such transfers between adjacent devices. As represented by the arrows within the array 105, each device 120 may include several channels for such transfers, including channels for 2-way communications with each adjacent device. The bandwidth of the array 105 for such transfers, therefore, is a function of the bandwidth of these inter-device channels. Further, the latency of a transfer operation is defined by two variables: 1) the number of "hops" (devices traversed) for the data to reach its target (e.g., device 120 or requestor 180), and 2) the time taken by each device in the path of the transfer operation to forward the data the next device in the path.

To facilitate the flow of requests and data through the array 105, each of the devices of the array 105 may perform arbitration among request from multiple requesters 180 that require the use of the array 105 at the same time. For example, the memory device 120 receive requests and data packets from requestors 180 and other devices of the array 105 in any direction (north, south, east, west), and can output data and responses in those same directions. To manage this traffic flow, the memory device 120 may include a request arbiter circuit as described in further detail below. Using a request arbiter circuit, the memory device 120 may arbitrate among received packets as well as responses from the memory controller 110. Through the request arbiter circuit, the memory device 120 may also manage packets (data and/or requests) that are tagged with a priority indicator.

Example embodiments, described below, provide data arbitration that optimizes the routing of data between external requestors and destinations internal to the array. A request arbiter in example embodiments provides arbitration through combinatorial logic, enabling the granting of requests within the same clock cycle as receipt. The request arbiter may also avoid combinatorial logic loops, and can provide a new grant request during each clock cycle. Further, the request arbiter may uphold packet priority, for example by cycling through pending priority packets (e.g., via a round-robin selection process) followed by a subsequent cycling through non-priority packets.

As a result, such embodiments significantly reduce the latency exhibited by data transfer operations within the mesh circuit, thereby reducing the number of pending operations (e.g., outstanding requests) and thus the logic required to manage pending operations, saving power and reducing the circuit's needed area. Such embodiments also as minimize data traffic congestion within the circuit due to faster routing of data, thereby allowing a reduction in the size of buffers (e.g., first in, first out (FIFO) buffers) used to queue data and requests at each device. Although example embodiments below include memory subsystems, further embodiments may be implemented as any other subsystem comprising a mesh network of nodes, such as a distributed processing system comprising an array of processors and/or other devices.

Figure 2:
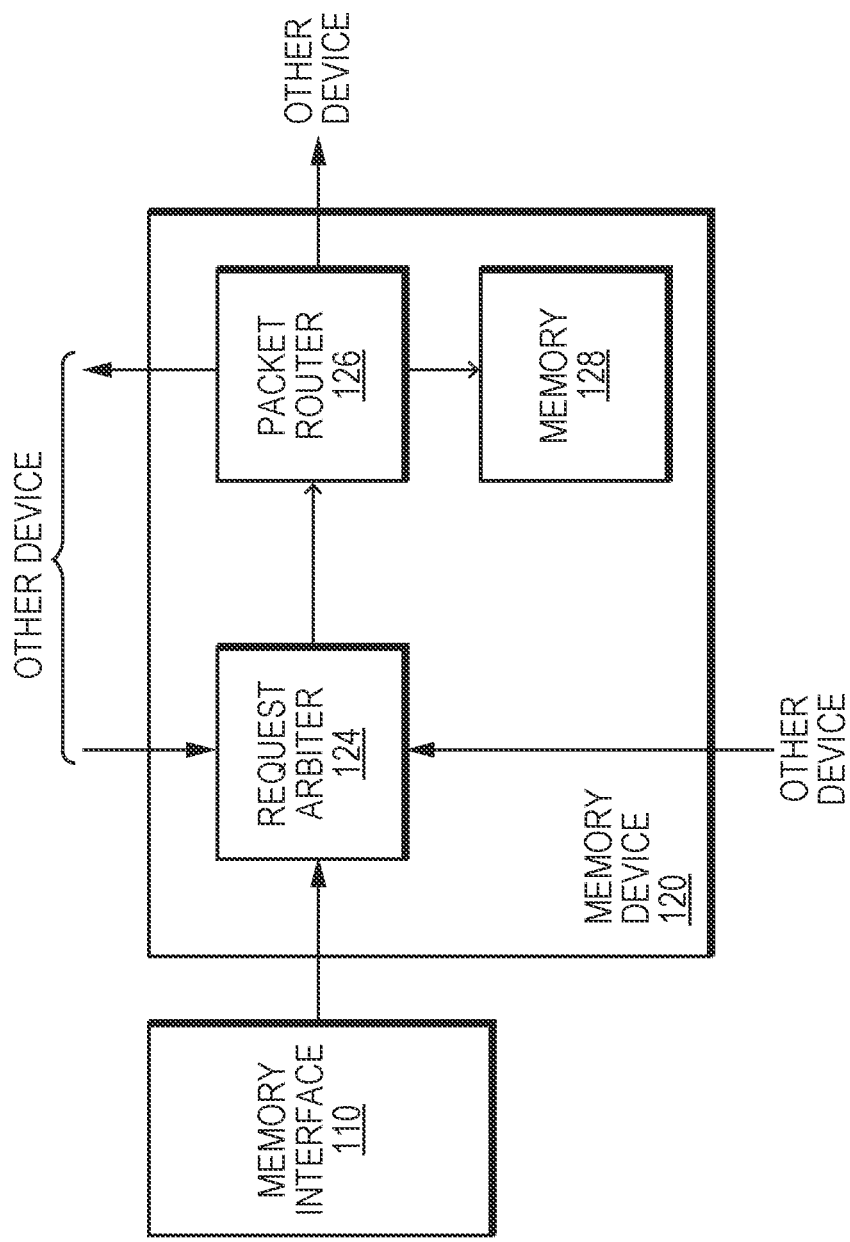
FIG. 2 is a block diagram of a memory device in one embodiment.

FIG. 2 illustrates a memory device 120 of the array 105 in further detail. As shown, the memory device 120 may include a request arbiter 124, a packet router 126, and a memory 128. The request arbiter 124 may communicate with the memory interface 110 and other devices of the array 105 for communications related to memory access operations. For example, the memory interface 110 and other devices of the array 105 may forward requests (e.g., memory access requests and/or data forwarding requests, with or without accompanying data packets) to the request arbiter 124. The request arbiter 124 may arbitrate among the requests, as described in further detail below, to determine a next request to be output to the packet router 126. The packet router 126 may parse the next request to determine whether the request is addressed to the memory device 120. If so, then the packet router may access its local memory 128 to execute a corresponding memory access operation. Otherwise, the packet router 126 may forward the request to another memory device toward its destination.

The request arbiter 124 may be configured to filter invalid requests from a plurality of requestors (e.g., the memory interface 110 and other devices of the array 105), and determine a bitvector representing a sequence of the plurality of requestors, wherein the bitvector indicates whether each of the plurality of requestors has a valid request. Each bit of the bitvector may be one of 1) a first value indicating a valid request, and 2) a second value indicating the absence of a request or an invalid request. The term "bitvector," as used herein, refers to any array of corresponding indicators, such as a scoreboard or an array of discrete bits. The request arbiter 124 may then output, to the packet router 126, an indication of a first request to be serviced by the memory device. For a subsequent request, the request arbiter 124 may shift the bitvector to determine the next request to be serviced by the memory device 120. Due to its use of combinatorial logic, the request arbiter 124 may also filter the invalid requests, determine the bitvector, and output the indication during a common, single clock cycle, and may filter the invalid requests and determine the bitvector independent of a clock signal. As a result, the request arbiter 124 may quickly and efficiently arbitrate among request without introducing latency to the operation of the device 120.

In further embodiments, the position of the request arbiter 124 and the packet router 126 may be switched. In such a configuration, the packet router 126 may first route all received requests, forwarding the requests either to the request arbiter 124 or other devices of the array 105 based on their destination address. The request arbiter 124 may then operate to arbitrate among requests addressed to the memory 128.

Figure 3:
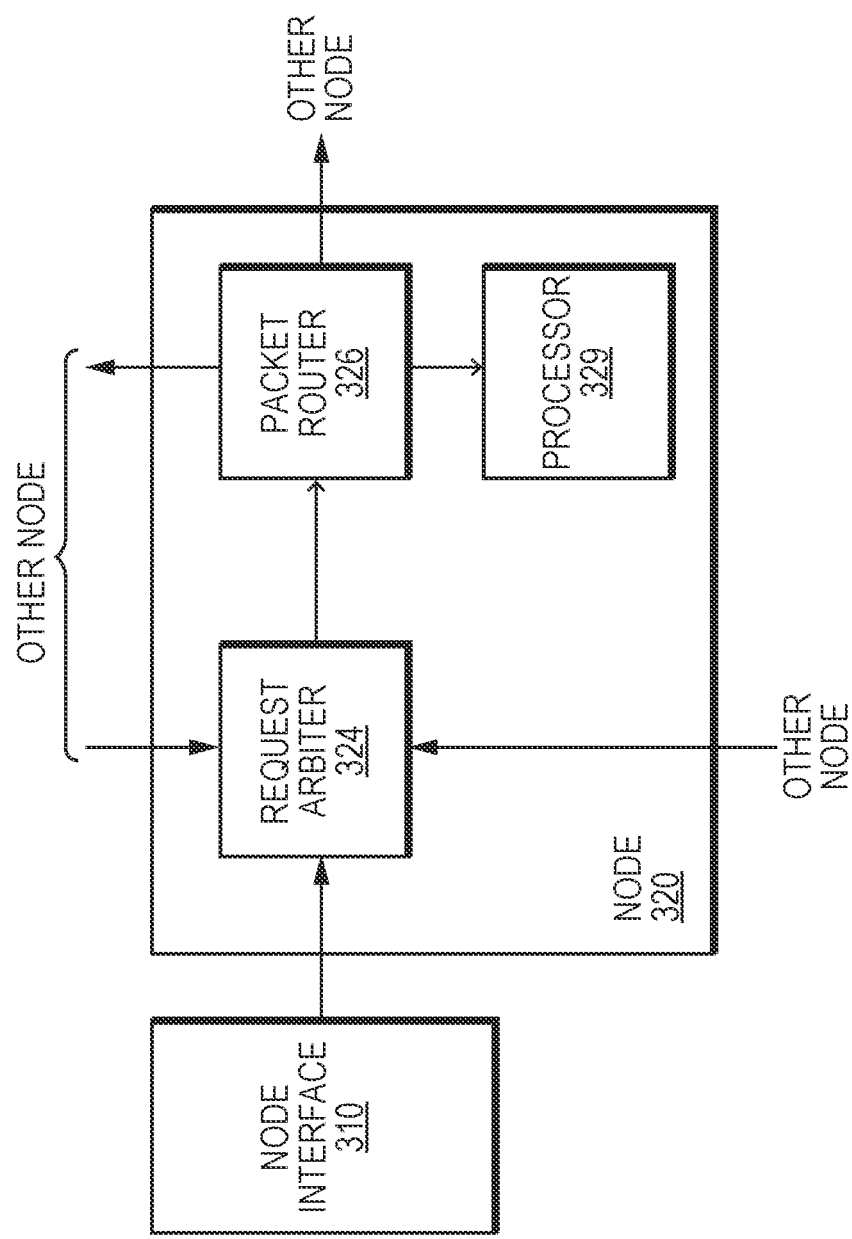
FIG. 3 is a block diagram of a node in a further embodiment.

FIG. 3 is a block diagram of a mesh interface 320 and a node 330 that may be implemented in place of a memory interface and one or more of the memory devices in the array described above. For example, as an alternative to a memory device, the array of FIG. 1 may be configured as a distributed processing mesh, which may include an array of processing units alone or in combination with other nodes, such as memory devices.

The mesh interface 310 and node 320 may be configured comparably to the memory interface 110 and memory device 120 described above. In particular, the node 310 may include a request arbiter 324, a packet router 332, and a processor 329. The request arbiter 324 may communicate with the node interface 310 and other devices of the array 105 for communications related to processor operations. For example, the node interface 310 and other devices of a node array may forward requests (e.g., a request to complete a processing task) to the request arbiter 324. The request arbiter 324 may arbitrate among the requests, as described in further detail below, to determine a next request to be output to the packet router 326. The packet router 326 may parse the next request to determine whether the request is addressed to the node 320. If so, then the packet router may access its local processor 329 to execute a corresponding processor operation. Otherwise, the packet router 126 may forward the request to another node toward its destination.

Figure 4:
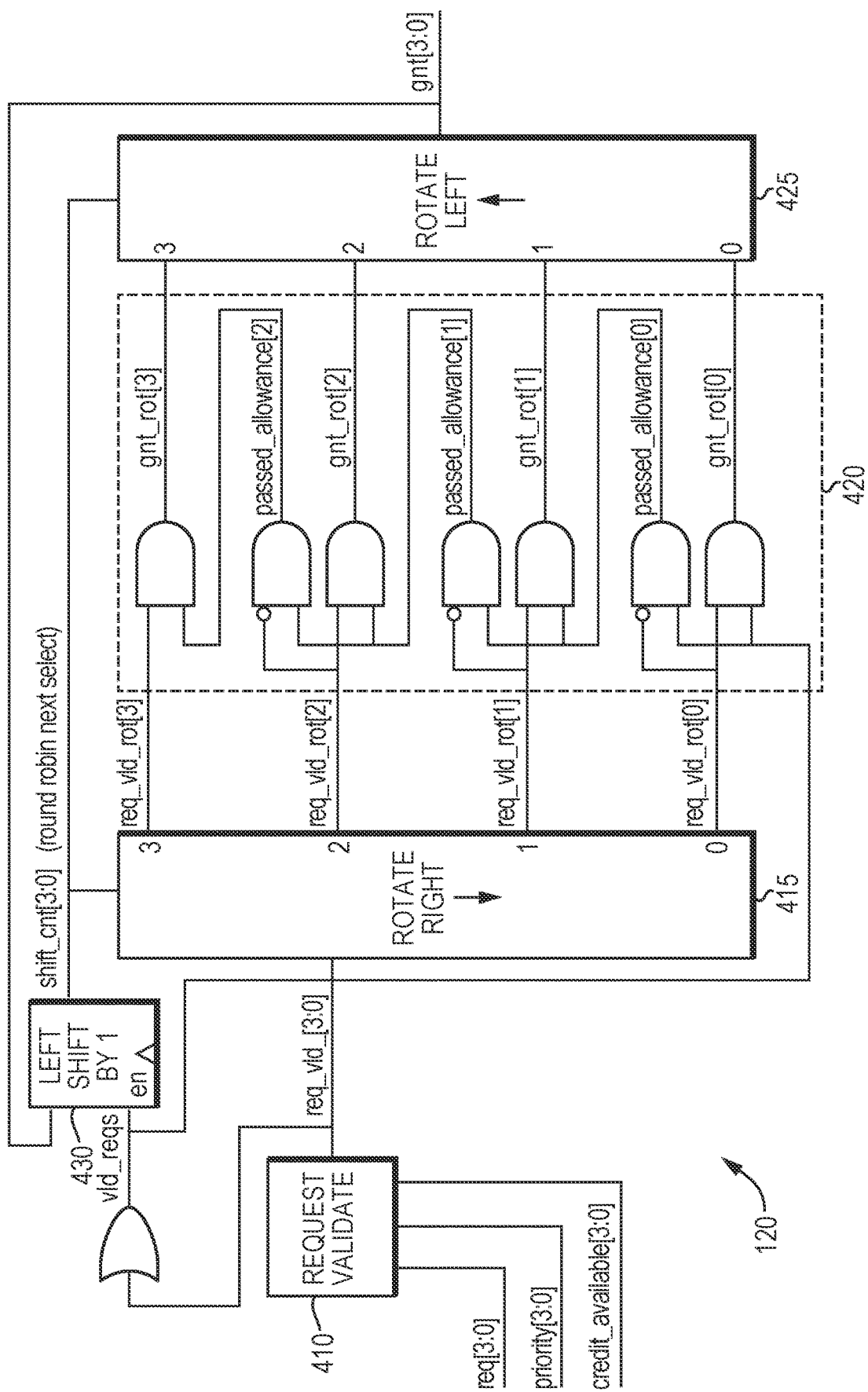
FIG. 4 is a circuit diagram of a request arbiter in one embodiment.

FIG. 4 is a circuit diagram of the request arbiter 120 in further detail. A validate block 410 may operate to filter invalid requests from a plurality of requestors and output a bitvector (req_vld[3:0]) representing a sequence of the plurality of requestors, the bitvector indicating whether each of the plurality of requestors has a valid request. As shown, for example, the validate block 410 may receive bitvectors corresponding to requests (req[3:0]), priority requests (priority[3:0]), and credits available (credit_available[3:0]), wherein each bit of the received bitvectors indicates a request or credit for a corresponding requestor. If the validate block 410 detects any priority requests, then it may output the bitvector indicating only those priority requests, preserving the non-priority requests for subsequent service. Otherwise, the validate block 410 may compare the request bitvector against the credits bitvector, outputting the bitvector to indicate only non-priority requests from requestors that have a required credit. Thus, each bit of the bitvector output by the validate block 410 may be one of 1) a first value indicating a valid request, and 2) a second value indicating the absence of a request or an invalid request.

A first rotation block 415 may operate to output a first parallel signal (req_vld_rot) representing the bitvector, and (optionally) shift the first parallel signal relative to the bitvector in response to a shift signal (shift_cnt). A logic block 420 may output a second parallel signal (gnt_rot) indicating a bit of the first parallel signal corresponding to a next request to be granted. In particular, if the first (0) bit of the first parallel signal is 0 to indicate no valid request for the given requestor, then the logic block 420 may pass sequentially through the bits of the first parallel signal until it identifies a bit indicating a valid request. Further, the logic block 420 can determine not to loop from the last bit (3) to the first bit (0) if the next selected requestor is already positioned at the first bit. A second rotation block 425 may operate to shift the second parallel signal in a direction counter to the shift of the first rotation block 415, thereby reversing the rotation of the first rotation block. The second rotation block 425 may then output a grant bitvector (gnt[3:0]), based on the shifted second parallel signal, indicating one of the plurality of requestors to grant a next request. By rotating the values of the bitvector in two directions via the first and second rotation blocks 415, 425, the request arbiter 120 can avoid combinatorial loops.

A shift block 430 may receive the grant bitvector to determine which requestor won the most recent grant, and thereby determine which requestor is next in line to receive a grant. Based on this determination, the shift block 430 may selectively output the shift signal, thereby causing the first rotation block to cycle through the bitvector to determine a subsequent request to grant. The validate block 410, first rotation block 415, logic block 420, and second rotation block 425 may be constructed of combinatorial logic that may operate independent of a clock signal. As a result, the request arbiter 120 may filter the invalid requests, output the parallel signals, and output the grant bitvector during a common, single clock cycle.

Figure 5:
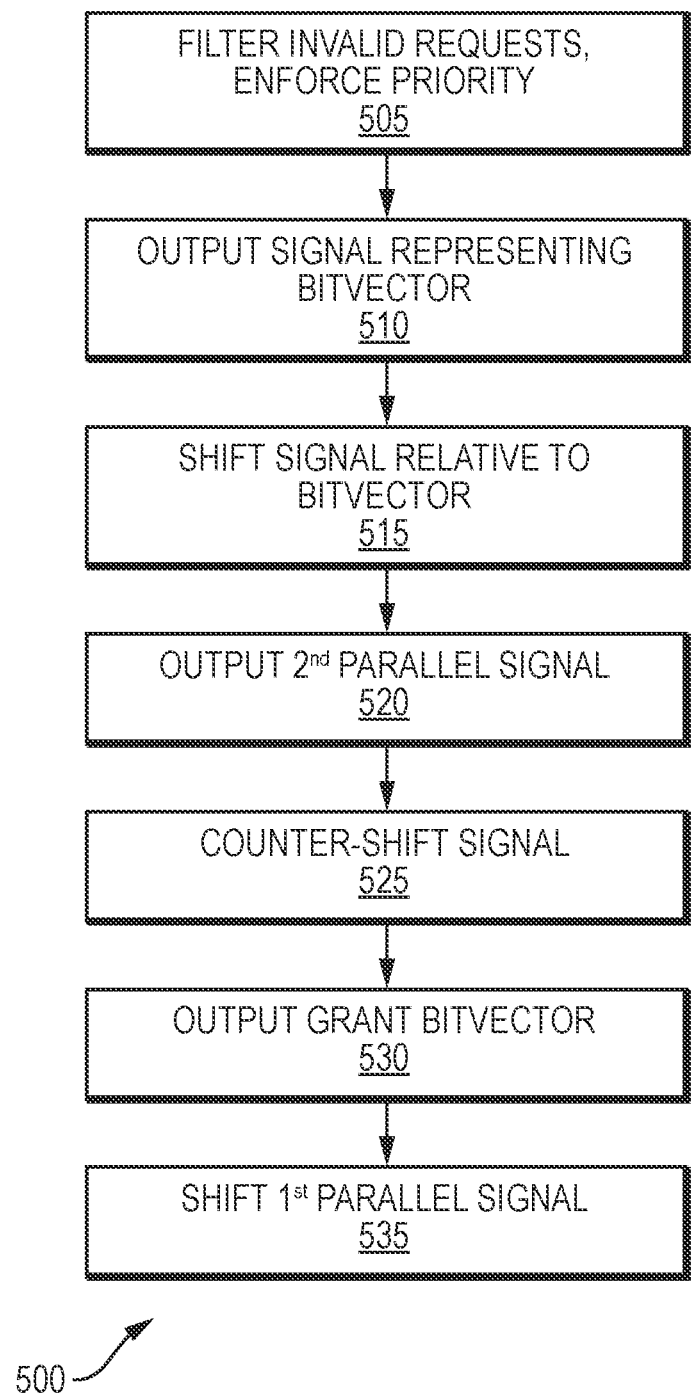
FIG. 5 is a flow diagram of a method of routing a request in one embodiment.

FIG. 5 is a flow diagram of a process 500 of arbitrating a request in one embodiment. The process 500 may be carried out by any of the embodiments described above, and may be applied to the routing of any signal (e.g., data, command, request) through a mesh circuit. With reference to FIG. 4, the validate block 410 may filter invalid requests from a plurality of requestors and output a bitvector representing a sequence of the plurality of requestors (505). The first rotation block 415 may output a first parallel signal representing the bitvector (510), and (optionally) shift the first parallel signal relative to the bitvector in response to a shift signal (515). The logic block 420 may output a second parallel signal indicating a bit of the first parallel signal corresponding to a next request to be granted (520). The second rotation block 425 may shift the second parallel signal in a direction counter to the shift of the first rotation block 415, thereby reversing the rotation of the first rotation block (525). The second rotation block 425 may then output a grant bitvector, based on the shifted second parallel signal, indicating one of the plurality of requestors to grant a next request (530). The shift block 430 may output the shift signal selectively in response to detecting the grant bitvector, thereby causing the first rotation block to cycle through the bitvector to determine a subsequent request to grant (535).

While example embodiments have been particularly shown and described, it will be understood by those skilled in the art that various changes in form and details may be made therein without departing from the scope of the embodiments encompassed by the appended claims.

What is claimed is:
1. A circuit, comprising:
 a memory array having a plurality of memory devices, each of the memory devices including:
  a memory configured to store packet data, and
  a request arbiter configured to interface with at least one other memory device of the memory array, the request arbiter configured to:
   filter invalid requests from a plurality of requestors;
   determine a bitvector representing a sequence of the plurality of requestors, the bitvector indicating whether each of the plurality of requestors has a valid request, output a first parallel signal representing the bitvector, shift the first parallel signal relative to the bitvector in response to a shift signal, output a second parallel signal indicating a bit of the parallel signal corresponding to a first request to be serviced by the memory device, and shift the bitvector to determine a second request to be serviced by the memory device; and a memory interface configured to route requests from a requestor to the memory array.

2. The circuit of claim 1, wherein the request arbiter is further configured to filter the invalid requests, determine the bitvector, and output the indication during a common, single clock cycle.

3. The circuit of claim 1, wherein the request arbiter is further configured to filter the invalid requests and determine the bitvector independent of a clock signal.

4. The circuit of claim 1, wherein each bit of the bitvector represents a respective one of the plurality of requestors.

5. The circuit of claim 4, wherein each bit of the bitvector is one of 1) a first value indicating a valid request, and 2) a second value indicating the absence of a request or an invalid request.

6. A circuit for arbitrating requests, comprising:

a validate block configured to filter invalid requests from a plurality of requestors and output a bitvector representing a sequence of the plurality of requestors, the bitvector indicating whether each of the plurality of requestors has a valid request;

a first rotation block configured to 1) output a first parallel signal representing the bitvector, and 2) shift the first parallel signal relative to the bitvector in response to a shift signal;

a logic block configured to output a second parallel signal indicating a bit of the parallel signal corresponding to a next request to be granted; and a second rotation block configured to 1) shift the second parallel signal in a direction counter to the shift of the first rotation block, and 2) output a grant bitvector based on the second parallel signal, the grant bitvector indicating one of the plurality of requestors to grant a next request.

7. The circuit of claim 6, further comprising a shift block configured to output the shift signal selectively based on the grant bitvector.

8. The circuit of claim 6, wherein the validate block, first rotation block, and logic block are configured to filter the invalid requests, output the parallel signal, and output the grant request bitvector during a common, single clock cycle.

9. The circuit of claim 6, wherein the validate block is further configured to filter the invalid requests and output the bitvector independent of a clock signal.

10. The circuit of claim 6, wherein each bit of the bitvector represents a respective one of the plurality of requestors.

11. The circuit of claim 10, wherein each bit of the bitvector is one of 1) a first value indicating a valid request, and 2) a second value indicating the absence of a request or an invalid request.

12. A method of arbitrating requests, comprising:

at a node array having a plurality of node devices:

filtering invalid requests from a plurality of requestors and outputting a bitvector representing a sequence of the plurality of requestors, the bitvector indicating whether each of the plurality of requestors has a valid request;

outputting a first parallel signal representing the bitvector;

shifting the first parallel signal relative to the bitvector in response to a shift signal;

outputting a second parallel signal indicating a bit of the parallel signal corresponding to a next request to be granted;

shifting the second parallel signal in a direction counter to the shift of the parallel signal; and outputting a grant bitvector based on the second parallel signal, the grant bitvector indicating one of the plurality of requestors to grant a next request.

13. The method of claim 12, further comprising outputting the shift signal selectively based on the grant bitvector.

14. The method of claim 12, wherein the filtering the invalid requests, outputting the parallel signal, and outputting the grant request bitvector occur during a common, single clock cycle.

15. The method of claim 12, wherein the filtering the invalid requests and outputting the bitvector occur independent of a clock signal.

16. The method of claim 12, wherein each bit of the bitvector represents a respective one of the plurality of requestors.

17. The method of claim 16, wherein each bit of the bitvector is one of 1) a first value indicating a valid request, and 2) a second value indicating the absence of a request or an invalid request.

18. A circuit, comprising:

a node array having a plurality of node devices, each of the node devices including:

a processor configured to process packet data, and a request arbiter configured to interface with at least one other node device of the node array, the request arbiter configured to:

filter invalid requests from a plurality of requestors;

determine a bitvector representing a sequence of the plurality of requestors, the bitvector indicating whether each of the plurality of requestors has a valid request, output a first parallel signal representing the bitvector, shift the first parallel signal relative to the bitvector in response to a shift signal, output a second parallel signal indicating a bit of the parallel signal corresponding to a first request to be serviced by the node device, and shift the bitvector to determine a second request to be serviced by the node device; and an interface configured to route requests from a requestor to the node array.

19. The circuit of claim 18, wherein the request arbiter is further configured to filter the invalid requests, determine the bitvector, and output the indication during a common, single clock cycle.

20. The circuit of claim 18, wherein the request arbiter is further configured to filter the invalid requests and determine the bitvector independent of a clock signal.

21. A circuit, comprising:

at a memory device of a memory array having a plurality of memory devices:

means for filtering invalid requests from a plurality of requestors and outputting a bitvector representing a sequence of the plurality of requestors, the bitvector indicating whether each of the plurality of requestors has a valid request;

means for outputting a parallel signal representing the bitvector;
means for shifting the parallel signal relative to the bitvector in response to a shift signal;
means for outputting a second parallel signal indicating a bit of the parallel signal corresponding to a next request to be granted;
means for shifting the second parallel signal in a direction counter to the shift of the first rotation block; and
means for outputting a grant bitvector indicating one of the plurality of requestors to grant a next request.

* * * * *